Nov. 7, 1950 J. H. FRIDEN 2,529,382
TRIMMING MACHINE FOR CUPS AND THE LIKE
Filed April 3, 1945 8 Sheets-Sheet 1

INVENTOR.
BY John H. Friden
ATTORNEY

Nov. 7, 1950  J. H. FRIDÉN  2,529,382
TRIMMING MACHINE FOR CUPS AND THE LIKE
Filed April 3, 1945  8 Sheets-Sheet 2

INVENTOR.
BY John H. Fridén
H. C. Giesen
ATTORNEY

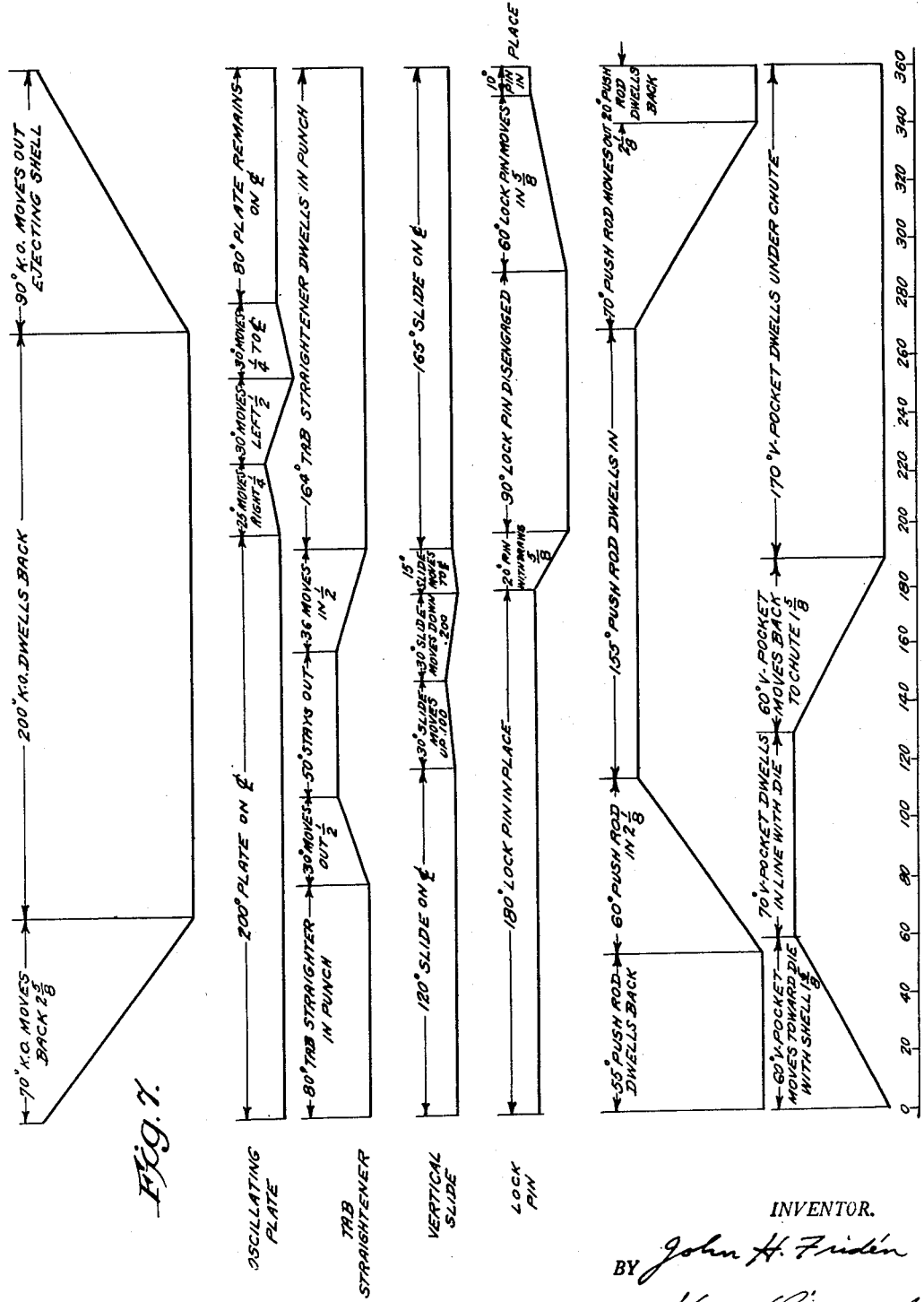

Nov. 7, 1950  J. H. FRIDEN  2,529,382
TRIMMING MACHINE FOR CUPS AND THE LIKE
Filed April 3, 1945  8 Sheets-Sheet 8
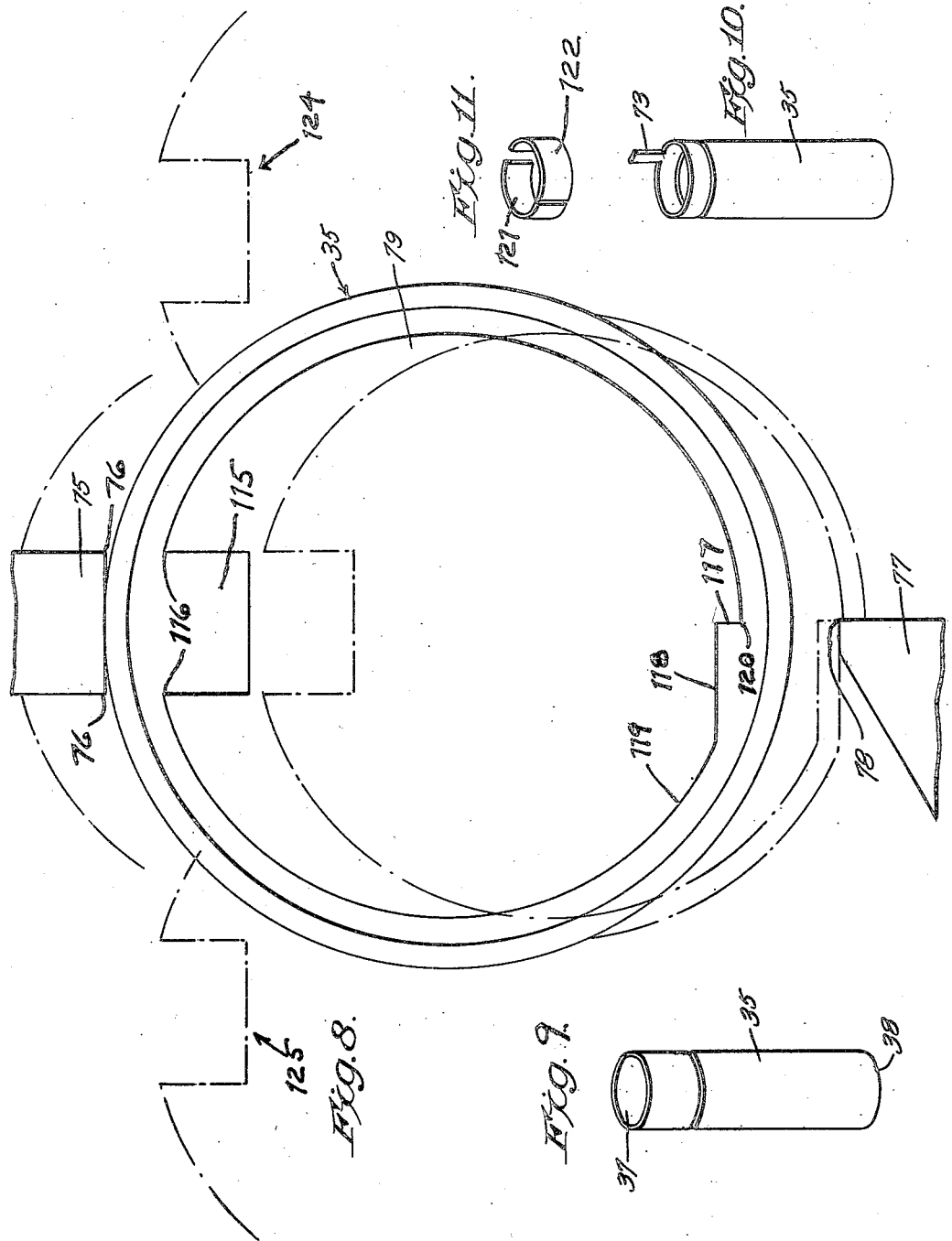
INVENTOR.
John H. Fridén
BY
H. C. [signature]
ATTORNEY Patented Nov. 7, 1950

2,529,382

UNITED STATES PATENT OFFICE 2,529,382

TRIMMING MACHINE FOR CUPS AND THE LIKE

John H. Fridén, Maplewood, N. J., assignor, by mesne assignments, to Sun Tube Corporation, Hillside, N. J., a corporation of New Jersey Application April 3, 1945, Serial No. 586,367

19 Claims. (Cl. 164—48)

This invention relates to a new and improved machine for trimming the ends of tubular members, such as metallic battery cups and the like, and more particularly for producing tab-like extensions at the open ends of cup members, or at one or both ends of other tubular members. It may be used advantageously in the performance of other similar forming or trimming operations on hollow members of various types.

By way of illustration of one purpose of the invention, considerable difficulty has been encountered in the uniform production of small zinc cups suitable for use as battery shells, each cup having a tab extending from the open end thereof to serve as an electrical connector with an adjacent similar cup or with a suitable binding post or other terminal. Small battery cups of this character are used to advantage in connection with hearing aids, for example.

It has been one of the objects of the present invention to provide a machine which is particularly suited for the trimming of the ends of cylindrical cups in a way to form integral tabs of the character mentioned.

A further object of the invention has been to provide a machine of the character indicated which is adapted for use in the trimming of cups of various sizes and for the formation of tabs of various dimensions. In this connection it has been a special object to provide a machine which is simple of construction, reliable in its operation, capable of producing cups of uniform character and one which may be operated economically and efficiently and which may be readily and quickly adapted for operation upon cups of different sizes.

Briefly, the machine includes means for automatically transferring the cups or articles to be tabbed, or otherwise trimmed, from a supply chute to a position in line with a die or holder for the work. Means is then provided for inserting the work in a suitable opening in the die and holding the work so positioned in predetermined relation to the cutting means. A punch or cutter fitting within the die opening and having substantial clearance with relation to the latter is mounted for transverse movement in a plurality of directions with respect to the axis of the die opening and is adapted to extend into the interior of the work piece as the latter is forced into the die opening. This punch, or cutter, is carried by a rock member which is, in turn, mounted upon a shiftable slide member. The arrangement is preferably such that the cutter may be shifted successively in four different directions, transversely of the axis of the die opening, from its normal central position. Two of these movements are imparted by the upward and then downward movement of the main slide and two are imparted by the rocking movement of the plate or carrier in which the cutter is directly mounted. This rocking movement is imparted first to one side and then to the other side of the normal central position. In lieu of the slide and pivoted rocker plate arrangement, just described, there may be provided a plurality of slides movable at right angles to each other or two rock members one mounted upon the other and the other upon the frame in such a way as to cause their rocking movements to carry the cutter along paths which are at substantially right angles with respect to each other.

Suitable stationary cutting elements, or die surfaces, are carried by the die holder in fixed relation to the work piece and these are so constructed and arranged as to cooperate with the shiftable cutter to perform the desired shearing operations. The net result of the various movements of the punch or movable cutter is to shear off all of the metal at the end of the cup, for a distance equal to the length of the desired tab, except in the region in which the tab is to be formed. The metal which is thus removed is, in the preferred construction of the machine, split into two sections of arcuate form adapted to be more readily discharged from the machine than a single, substantially annular piece of scrap.

A feature of the invention is the provision of means for automatically feeding the cups to be trimmed into trimming position, performing the shearing operation thereon and discharging both the finished article and the scrap.

Other objects, features, and advantages of the invention will appear from the detailed description of an illustrative form of the invention which will now be given in conjunction with the accompanying drawings in which:

Figure 7 is a chart indicating the timing of the operation of the various devices operated during a cycle of the machine;

Figure 8 is a diagrammatic view illustrating the relative positions of the cup and the movable cutting element at different points in the cycle of the machine;

Figure 9 is a perspective view of a battery cup of the type adapted to be trimmed on the improved machine;

Figure 10 is a perspective view of the cup after the trimming operation has been performed;

Figure 11 is a perspective view of the scrap sections produced by the machine; and Figure 12 is a detail, side view of a cup receiving trough embodied in the machine.

Figure 1:
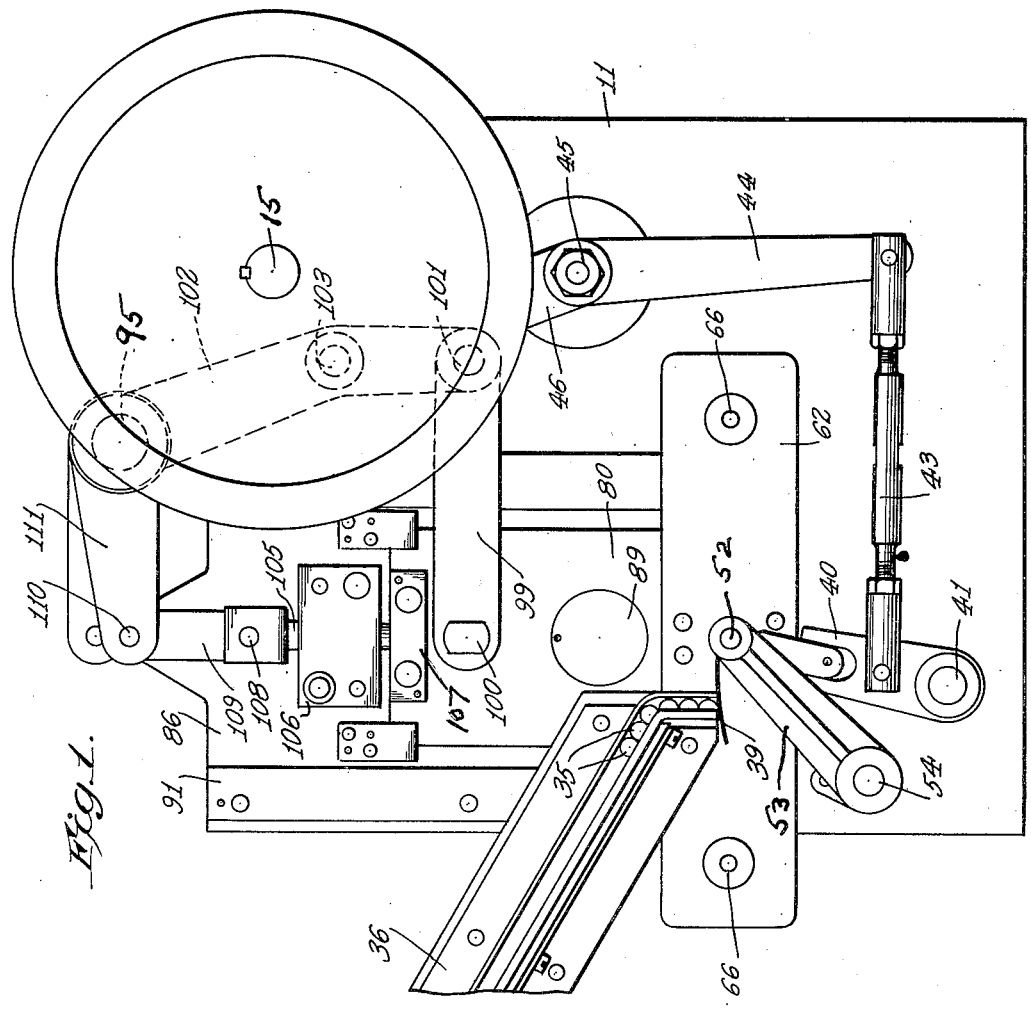
Figure 1 is a view in front elevation of a machine embodying the invention.
Figure 2:
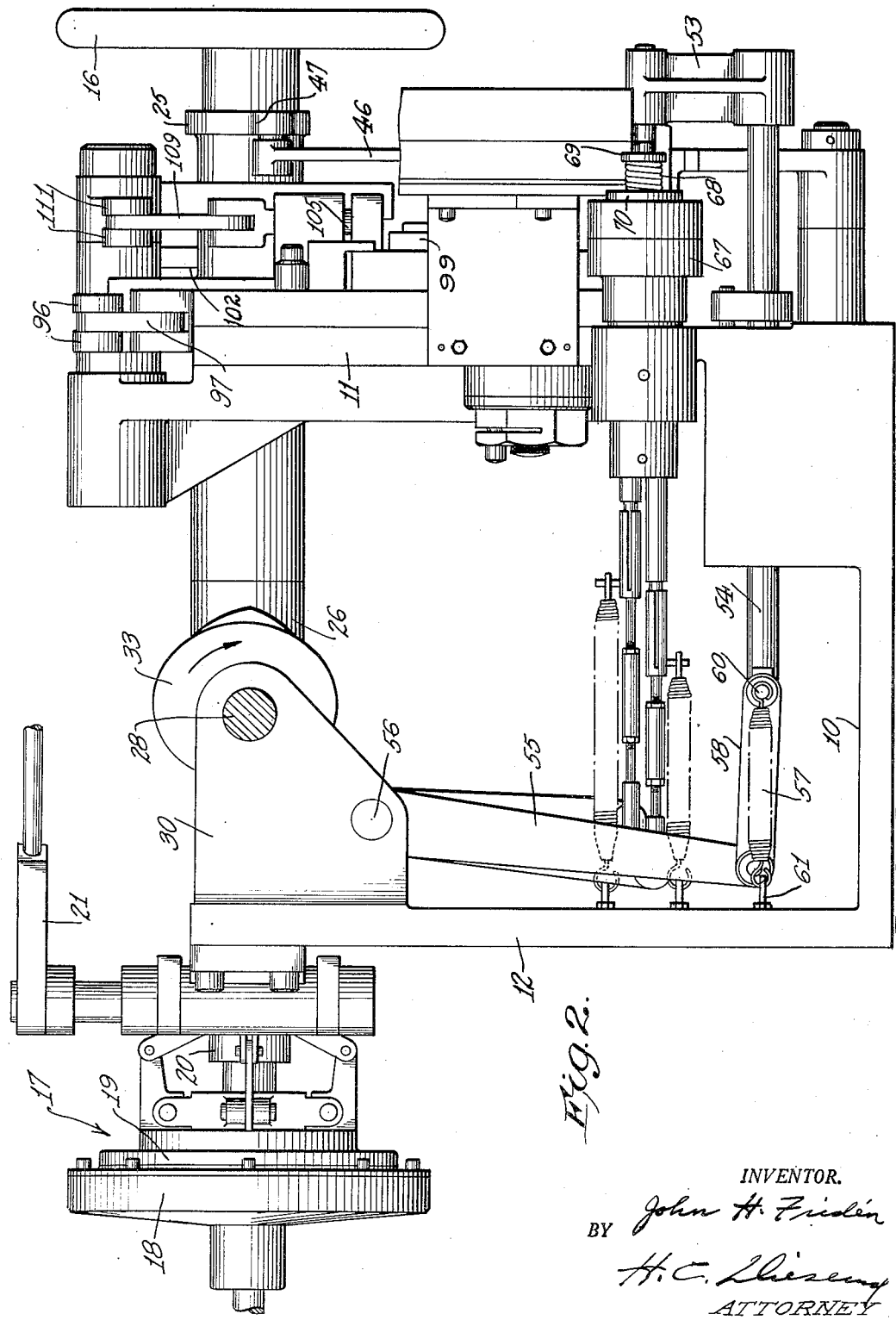
Figure 2 is a view in side elevation of the illustrative machine.
Figure 3:
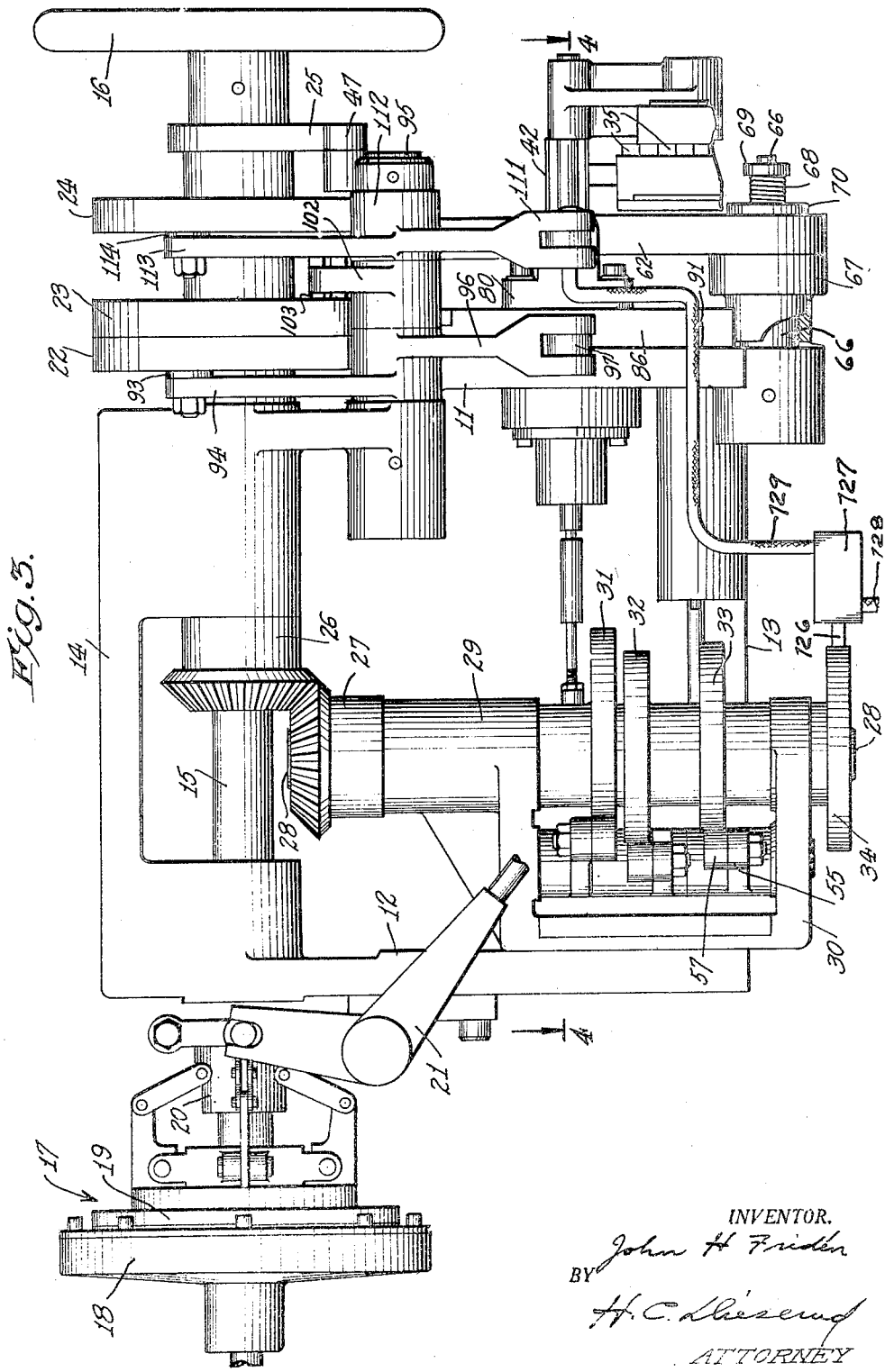
Figure 3 is a plan view of the machine with certain parts broken away and shown in section.

Referring now to the drawings, the machine preferably comprises a box-like frame on which the various operating devices are mounted. This frame, which may suitably be mounted on a table or a leg structure not shown, includes a bottom plate 10, a front wall 11, a rear wall 12, and two side walls 13 and 14 (Figures 1, 2, 3, and 4). In suitable bearings provided in the corner portions between the side wall 14 and front and rear walls 11 and 12 of the frame, there is mounted a main operating shaft 15. To one end of this shaft there is secured a hand wheel 16 by which the shaft may be turned whenever desired to bring the various operating devices into a predetermined position. Power may be supplied to the shaft 15 for the normal operation of the machine in any suitable way. A clutch designated generally by the numeral 17 may be employed for this purpose, this clutch having a driving member 18, loosely mounted on the shaft 15 and constantly rotated by connections (not shown) with a motor or the like, and a driven member 19 secured to the shaft and adapted to be coupled with the driving member upon the sliding of a collar 20 along the shaft by the manual swinging of a control lever 21. Since this clutch may be of any suitable known construction, it will not be described in further detail.

Secured to the shaft 15 is a series of box cams 22, 23, 24, and 25 adapted to perform four different functions, to be hereinafter described, during each cycle of the machine. Bevel gear 26 also secured to the shaft 15 meshes with another bevel gear 27 secured to a shaft 28 mounted in suitable bearings 29 and 30 provided in a bracket mounted on the machine frame. Secured to the shaft 28 is a series of cams 31, 32, 33, and 34 adapted to operate various additional devices for the performance of other functions during each cycle of operation of the machine. It will be understood that the shafts 15 and 28 are driven at the same speed.

The tubular articles to be trimmed, such as cups 35 of the type shown in Figure 9, are fed by gravity down a chute 36 of suitable construction, mounted in any appropriate way upon the frame of the machine. The articles may be supplied to the upper end of the chute either by hand or by any suitable automatic means, so as to present their open ends 37 rearwardly, toward the frame of the machine, and their bottoms 38 forwardly, toward the operator. When the parts of the machine are in the position illustrated in Figure 1, the lowermost cup is held in the chute at its lower end by means of a curved plate 39 secured to the upper end of a rock arm 40 rockably mounted on a stud 41 extending forwardly of the front wall of the machine. At its upper end the arm 40 also carries a trough-like receptacle 42 into which the lowermost cup 35 may drop as the rock arm is shifted toward the left in Figure 1 to position the trough beneath the lower open end of the chute. The curved guard 39 is simply an extension of one side of the V-trough. Rocking of the arm 40 in the manner indicated is accomplished by an extensible link 43 which is pivotally connected at one end to the arm 40 and at its other end to a lever 44 mounted on a stud 45, this lever having an upwardly extending arm 46 which carries a roller 47 cooperating with the periphery of the cam 25. A suitable spring (not shown) acting upon the arm 46 serves to hold the roller against the cam. It will be seen that by this arrangement the arm 40 will be rocked back and forth once upon each rotation of the shaft 15 to carry the trough 42 between a position in line with the lower end of the chute 36 and a position in line with an opening 48 (Figure 5) in a die member or cup retainer 49 which will be hereinafter more fully described. The trough 42, as best shown in Figure 12, has one side 42a pivotally mounted on the upper end of the arm 40, this being spring urged into the position indicated in which a pin 50 thereon engages a fixed part 51 of the trough. The arrangement is such that after the trough has been carried to the position in line with the opening 48 and the cup has been inserted in this opening, in the manner to be explained, the arm 40 and the trough 42 may immediately be restored toward the left in Figure 1 to permit a new cup to be dropped into the trough. This occurs while the trimming operation hereinafter explained takes place upon the cup inserted in the opening 48.

For the purpose of introducing the cup into the opening 48 a reciprocatory rod or plunger 52 is provided. This rod is carried at the upper end of an arm 53 which is secured at its lower end to a slide bar 54. This slide bar extends through a suitable bearing in the front wall 11 of the frame and is connected at its rearward end with the lower end of a lever 55 which is rockably mounted upon a shaft 56 and carries at its upper end a roller 57 cooperating with the periphery of the cam 33 which is secured to the shaft 28, as mentioned above. The connection between the bar 54 and the lower end of the lever 55 is by means of a link 58 which is pivotally attached to the bar and lever at its opposite ends. A spring 59 is connected at one end with a pivot pin 60 by which the link 58 is connected with the bar 54, the other end of the spring being connected with a hook 61 carried by the rear wall 12 of the frame. The arrangement is such that the bar 54 is retracted toward the right (Figure 4) until the roller 57 at the upper end of lever 55 engages the cam 33 (see Figure 3). In the position of the parts illustrated in Figure 4 the push rod 52 is held against the bottom of the cup which has been introduced into the opening 48 by the previous movement of the bar 54 toward the right (Figure 4) under control of the cam 33. After the trimming operation on the cup has been completed, the cam 33 rocks the lever 55 against the action of spring 59 and forces the bar 54 and push rod 52 toward the left in Figure 5. While the push rod is thus held toward the left, a new cup will be brought into line with it by the rocking of the arm 40. The cam 33 will then permit the spring 59 to draw the bar 54 and the push rod toward the right to insert the new cup in the die opening 48.

Figure 5:
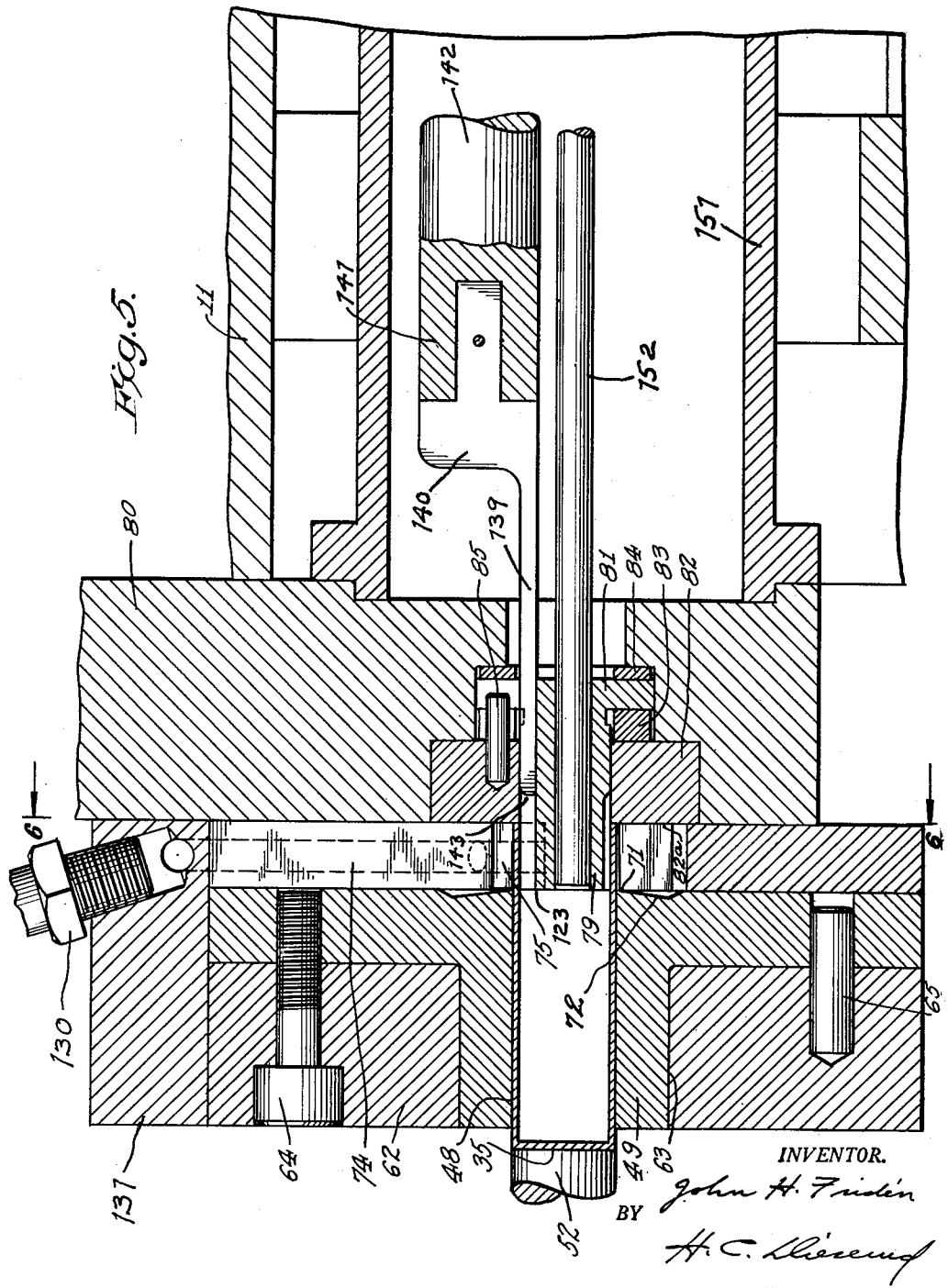
Figure 5 is an enlarged detail view illustrating more clearly the construction of certain of the parts associated with the cutting elements illustrated in Figure 4.
Figure 6:
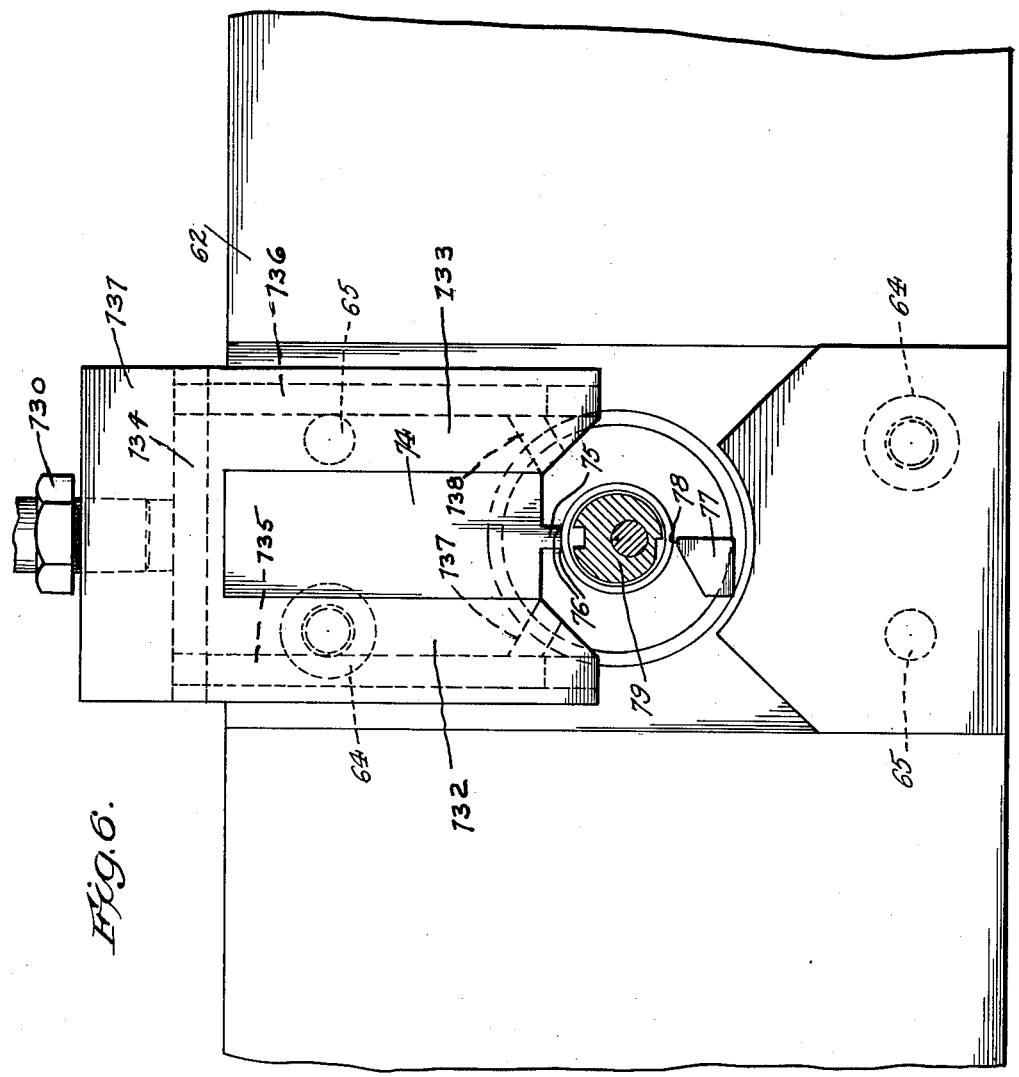
Figure 6 is a sectional view taken along the line 6—6 of Figure 5.

Turning now to Figures 5 and 6, the die or cup holder 49 is carried by a bar or bridge member 62. The holder has a sleeve-like extension fitting into a corresponding opening 63 in the bridge member and it is held in an accurately predetermined position on the bridge member by means of one or more screws 64. One or more dowel pins 65 may be employed to assist in accurately positioning the cup holder. Bridge member 62 is preferably yieldingly mounted on the frame. For this purpose a pair of studs 66, suitably secured to the frame, extend forwardly therefrom and are adapted to slidingly receive suitable openings in the bridge member. These openings in the bridge member are preferably provided with sleeve-like bearing members 67 which have a relatively close but free sliding fit with respect to the studs. A compression spring 68, surrounding each of the studs 66 between a collar or washer 69 at the outer end of the same and a washer 70 forced against the outer surface of the bridge member, serves to yieldingly urge the latter toward the front wall 11 of the frame. The purpose of this construction, as will appear more clearly hereinafter, is to retain certain cutting or shearing edges in yielding engagement during the cutting operation. The inner edge 71 surrounding the cup receiving opening 48 in the holder 49 provides a sharp cutting edge for the shearing operation to be hereinafter described. Outwardly from the substantially annular cutting edge 71 the inner face of the cup holder is relieved as indicated at 72 in order to facilitate the shearing operation and the removal of the resulting scrap.

Assuming that the trimming operation to be performed is such as to provide a tab of the type indicated at 73 in Figure 10, at the end of the container 35, a block 74 (Figure 6) is secured to the inner face of the die or cup holder 49 in any suitable way. This block has a downwardly extending projection 75 which is of substantially the same width as the tab 73 and of a depth, i. e., in the direction of thickness of the block, equal to the length of the tab 73. The two corners 76 serve as shering edges in conjunction with other cutting edges to be hereinafter described. Also secured to the inner face of the die member 49, below the opening 48 therein, is a second fixed cutter 77 which may be of generally rectangular configuration but has a downwardly sloping upper surface, as shown in Figure 6, and has a cutting edge 78 positioned directly beneath the end of the cup in the vertical plane containing the axis of the retaining opening. The cutters 74 and 77 are of just the right thickness, at least in the region of their cutting edges 76 and 78, to provide such cutting edges of a length equal to the desired length of the tab 73. The arrangement is preferably such that the position of the bridge member 62 under the yielding action of the spring 68 is determined by the engagement of the free inner surfaces of the fixed cutters 74 and 77 with a cooperating surface to be hereinafter pointed out.

Cooperating with the fixed cutters 74 and 77 and the edge 71 of the die 49, in performing the trimming operation upon the cup 35 held within the die member, is an elongated sleeve-like cutter 79. As will now be explained, the cutter 79 is so mounted and arranged as to be given a movement in four different directions radially with respect to the axis of the die opening 48 and thus performs the desired trimming operation. For this purpose the cutter is mounted in a rock plate 80. An enlarged head 81 on the cutter fits snugly within an opening in the rock plate 80, while the main shank of the cutter extends through an opening in a block 82 suitably secured to the rock plate within an enlarged portion of the opening or recess in its outer face. The block 82, which serves to retain the cutter 79 in a predetermined position in relation to the rock plate, is preferably formed of hardened steel. Its outer surface 82a provides the abutment against which the cup 35 is held by the push-on member 52 during the cutting operation and it is also the surface against which the cutting elements 74 and 77 are urged, as hereinabove explained, by the action of the springs 68 on the bridge member 62. Suitable spacer rings 83 and 84 may be provided on the opposite sides of the enlarged head 81 of the movable cutter and by variation in their thickness the axial position of the cutter may be adjusted as desired. One or more dowel pins 85 (Figure 5) may be employed for retaining the cutter 79 in predetermined relation to the block 82.

Figure 4:
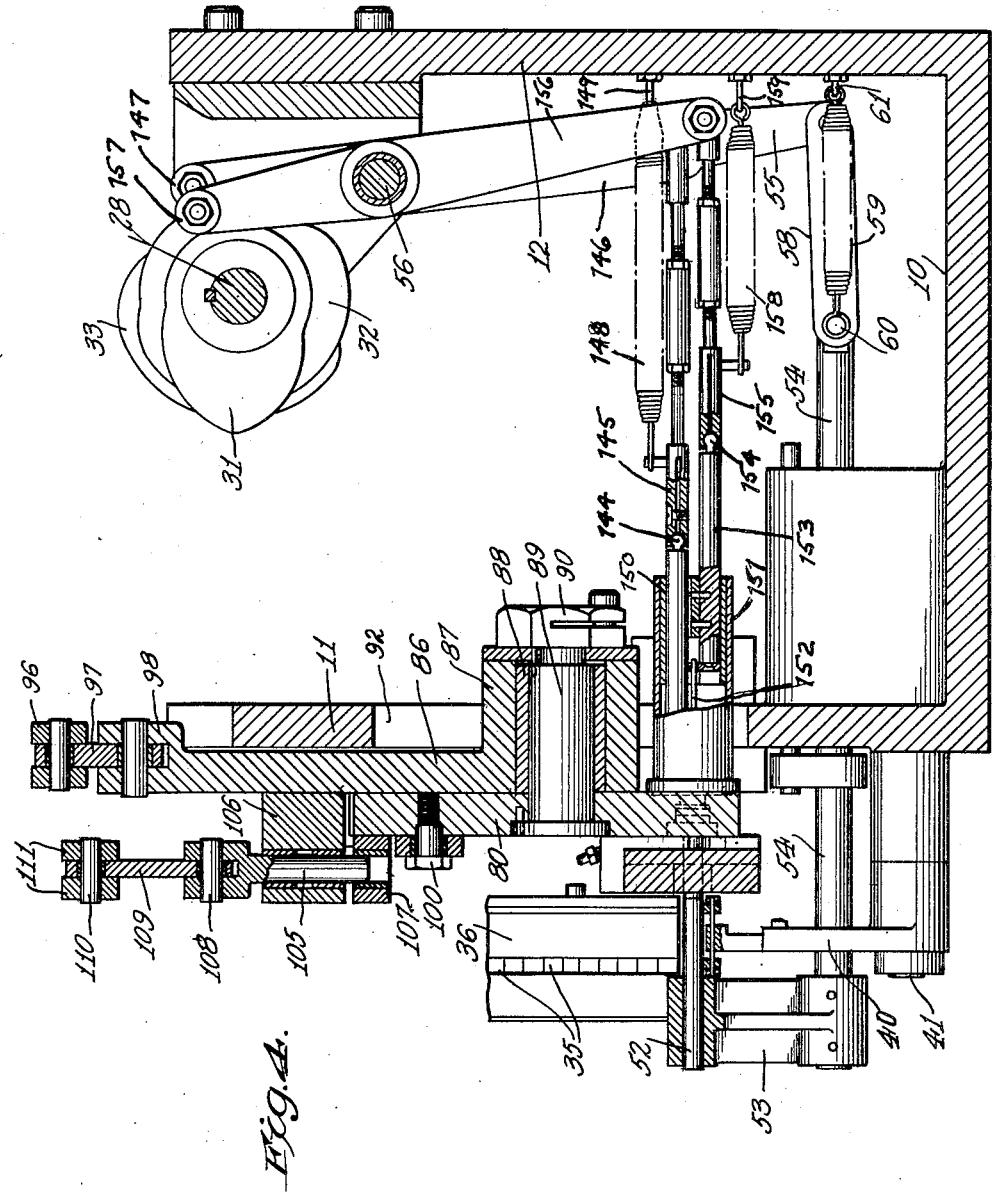
Figure 4 is a vertical sectional view taken along the line 4—4 of Figure 3.

The rock plate 80 is swivelly mounted on a slide member 86. For this purpose the slide member is provided with an inwardly extending boss 87 which carries a bearing sleeve or bushing 88 adapted to receive a stud 89 which is carried by the rock plate 80 and extends inwardly therefrom. A nut 90, of self-locking type, carried by the inner end of the stud 89 serves to secure the rock plate and slide member in assembled relation. Slide member 86 is mounted for vertical reciprocation on the outer face of the front wall 11 of the frame. Gibs 91 (Figures 1 and 3) secured to the outer face of wall 11 serve to provide suitable guide ways for the slide member. As best shown in Figure 4, an opening 92 is provided through the wall 11 for the passage of the sleeve portion 87 of the slide member, this opening being of sufficient dimension to enable the desired up and down movements to be imparted to the slide. Reciprocating movements are imparted to the slide by means of the box cam 22 secured to the shaft 15. A roller 93 cooperating with the raceway of the cam is mounted upon a rock arm 94 which is pivotally mounted upon a stud 95 held by the frame. An arm 96 integral with the arm 94 and projecting in the opposite direction from the pivot 95 is forked to receive the upper end of a link 97 whose lower end is pivotally connected with a forked upper end portion 98 of the slide member. This arrangement is such that upon each revolution of the cam 22 the slide member will be shifted first upwardly from its normal central position, then downwardly below its normal central position, and then restored to its central position.

Rocking movements are imparted to the rock plate 80 by suitable connections including a link 99, pivotally connected by a screw 100 with the plate 80 at a point above its axis of oscillation, i. e., the axis of stud 89. At its opposite end the link 99 is pivotally connected at 101 with the lower end of an arm 102 rockably mounted upon the stud 95. A roller 103 carried by the arm 102 intermediate its ends cooperates with a suitable raceway (not shown) in the box cam 23. This arrangement is such that upon each rotation of the shaft 15 the rock plate 80 will be rocked first in one direction from its normal central position, then in the opposite direction to an equal extent beyond the normal central position, and then back to said central position. The timing of the cams 22 and 23 is such that the rocking of the plate 80 takes place while the plate 86 is held in its normal central position. Since it is important to maintain the rock plate 80 in a definite, predetermined relation to the slide member 86 during the up and down movements of the latter, in order to insure proper coaction between the fixed and movable cutting edges, a lock pin 105 is provided. This serves to retain the rock plate and slide member in predetermined relation except during such times as the rock plate is being oscillated. Lock pin 105 is slidably mounted in a block 106 secured to the forward face of the slide member. The pin projects below the block 106 into engagement with an opening in a block 107 secured to the upper end of the rock plate. For the purpose of disengaging the lock pin from the opening in the block 107 during the period of oscillation of the rock member, a link 109 is connected by a pivot pin 108 with the upper forked end of the lock pin. The upper end of link 109 is connected by a pivot pin 110 with an arm 111 of a rock member 112 carried by the stud 95. A rearwardly extending arm 113 of rock member 112 carries a roller 114 arranged to cooperate with the raceway in the box cam 24.

Referring now to Figure 8, there is shown on an enlarged scale and in a somewhat schematic way the cross-sectional form of the cutter 79. As here indicated, this cutter when intended to form a tab-like projection 73 on the cup is provided with a longitudinal groove or keyway 115 at its top adapted to cooperate with the projection 75 of the fixed cutter member 74. A relatively close fit is provided between these parts as the cutter 79 is moved upwardly upon the upward movement of the slide 86. The edges 116 at the top of the groove 115 cooperate with the edges 76 to effect a shearing action upon the wall of the cup 35 to form the side edges of the tab 73. On the under side of the cutter 79 there is provided a radially inwardly extending surface or shoulder 117, formed preferably by the milling of a flat surface 118 on the bottom of the cutter. If desired, however, the surface 119 of the cutter may be gradually curved inwardly to provide the shoulder 117. In whatever way this is provided, a shearing edge 120 is formed which is adapted to cooperate with the edge 78 of the fixed cutter 77 as the cutter 79 moves downwardly. As indicated in Figure 8, the cutter 77 is preferably located a slight distance below the lower edge of the cup 35 in the initial position of the parts. The downward movement of the cutter 79, therefore, carries the wall of the cup a slight distance downwardly before it engages the shearing edge 78 to split the substantially annular piece of scrap into two sections 121 and 122, such as indicated in Figure 11. It will be understood that during the upward and downward movements of the punch or cutter 79, in the manner explained, the outer end of the cutter will produce a shearing action around the cup by the coaction of the substantially annular cutting edge 123 (Figure 5) with the corresponding edge 71 of the die member 49. Thus upon the upward movement of the cutter 79, the tab 73 may be fully formed and the scrap members 121 and 122 will be partially produced as a single continuous part. Then upon the downward movement of the cutter 79, the scrap sections will be further partially sheared from the end of the cup and they will be split into the two parts indicated by the action of the shearing edges 78 and 120. The cutter 79 is then returned upwardly to its central position, shown in full lines in Figure 8, and subsequently by the rocking of the plate 80, it is carried firstly to the position indicated in broken lines at 124 and then into the position indicated in broken lines at 125. These movements of the cutter 79 serve to complete the shearing of the scrap sections 121 and 122 from the end of the cup by the coaction of the shearing edges 71 and 123. Cutter 79 then is returned to the full line position indicated in Figure 8 and the rock plate 80 is locked by pin 105 in its central position on the slide member 86.

To facilitate the removal of the scrap sections 121 and 122, means are provided for introducing a blast of air in the region of these scrap sections upon the completion of the shearing operation. This is accomplished by means of the cam 34 secured to the end of the shaft 28. This cam cooperates with a spring pressed plunger 126 (Figure 3) forming part of a valve unit 127. When the plunger is pressed inwardly by the cam it opens the valve to permit air, delivered from any suitable source through a hose line 128, to be directed through a line 129 to a fitting 130 (Figures 5 and 6). The timing of the cam 34 is such as to deliver a blast of air to the fitting 130 during a brief interval in each cycle coinciding with, or briefly following, the formation of the scrap sections. Fitting 130 is preferably mounted in a block 131 which is secured to the top of the bridge member 62 and which has a downwardly extending portion (Figure 6) having two branches 132 and 133 which straddle and are disposed at opposite sides of the cutter member 74. The parts 132 and 133 are preferably not quite as thick as the active or controlling portion of the cutter 74 so that it does not interfere with the positioning of the bridge member under the action of the springs 68. As best shown in Figures 5 and 6, the downwardly extending portion of block 131 is provided with suitable channels 134, 135, 136, 137, and 138 by which the air delivered to the fitting 130 will be discharged downwardly and inwardly toward the axis of the cutter 79. This will bring about the forceful ejection of the scrap sections 121 and 122 in the manner explained. The relief of the face of the die member 49, as indicated at 72 in Figure 5, serves to facilitate the removal of the scrap sections and prevents the jamming of these sections in the space between the die member and the rock plate 80.

After the formation of the tab 73 by the upward movement of the cutter 79 and upon the subsequent downward movement of the cutter, there is a tendency for the tab to stick in the groove 115 and to be bent downwardly as the cutter moves down. To eliminate this danger and also to guard against the accumulation of dirt, metal particles, and the like within the groove 115, a reciprocable slide is mounted within the groove 115. This slide, as best shown in Figure 5, is in the form of a slender finger 139 formed as an extension of a member 140 which is connected with the forward end 141 of a reciprocable rod 142. The forward end 143 of the finger is preferably rounded or wedge shaped to facilitate its introduction beneath the tab 73 as the finger is urged toward the left in Figure 5 to a position substantially flush with the outer end of the cutter 79. This outward movement of the finger or slide is produced as follows: The opposite end of the rod 142 is connected by a universal joint 144 with one end of an extensible link 145 which is connected at its other end with the lower end of a downwardly extending lever 146 pivotally mounted on the shaft 56. Lever 146 carries at its upper end a roller 147 cooperating with the periphery of the cam 32. A spring 148 connected at one end with the link 145 and at its other end with a hook 149 carried by the frame of the machine, serves to hold the roller 147 in engagement with the cam 32. Rod 142 is slidably mounted in a bearing member 150 carried by a tubular member 151 secured to the inner face of the rock plate 80 in the region of the cutter 79. The arrangement is such that the slide or finger 139 is permitted to move sidewise and up and down with the cutter 79 by virtue of the universal connection 144 between the parts 142 and 145.

For the purpose of ejecting the cups 35 from the die upon completion of the trimming operation, an ejector rod 152 is mounted for axial sliding movement through a central opening in the cutter 79. Ejector rod 152 is carried in offset relation by the forward end of a slide rod 153 which is slidably mounted in the bearing element 150. At its inner end the rod 153 is connected by a universal joint 154 with an extensible link 155, the opposite end of which is connected with the lower end of a lever 156 (Figure 4) pivotally mounted upon the shaft 56 and carrying at its upper end a roller 157 cooperating with the periphery of the cam 31. A spring 158, connected at one end with the link 155 and at its opposite end with a hook 159 secured to the frame, serves to draw the rod 153 toward the right in Figure 4 and holds the roller 157 in engagement with the cam. The timing of the operation of the latter is such as to force the rod 153 and ejector 152 toward the left (Figures 4 and 5) after the trimming operation has been completed.

Figure 7 illustrates diagrammatically the relative timing of the various operating devices hereinabove described, with the exception of the air blast controlling cam. The timing of this has been hereinabove set forth. Figure 7, it will be noted, indicates the cycle starting with the point at which the cup retaining pocket 42 begins to move from its position beneath the chute to its position in line with the die opening. The relative positions of the various parts at this and succeeding points in the cycle may be readily determined from the chart. Thus as the pocket is shifted in the manner specified, the only other operation which takes place is the withdrawal of the knock-out pin 152 from its ejecting position to its retracted position. After the pocket has reached the position in line with the die opening, the push rod 52 is operated to introduce the cup into the die opening. During the latter portion of this period the tab straightening slide or finger 139 is retracted to the position indicated in Figure 5. Subsequently the vertical slide is shifted upwardly to cause cutter 79 to form the tab and then downwardly to further shear the end of the cup and to divide the scrap into two sections. The slide and the cutter are then returned to their central positions. Shortly after the tab has been formed, the tab straightener is moved toward the left again (Figure 5) to force the tab out of the groove 115 in the cutter and to fill this groove. As the vertically movable slide 86 is returned from its lower position toward its central position, the lock pin 105 is withdrawn from the rock plate and the latter is then given its movements, first toward the right, then the left, and then back to the central position. During all of this period the push rod 52 serves to hold the cup in the die opening. Upon completion of the trimming operation the push rod is retracted and at about the same time the lock pin 105 is restored to lock the rock plate to the slide member. Also, at about the same time, the ejector pin 152 is moved toward the left in Figures 4 and 5 to eject the trimmed cup. In the meantime, in fact at about the commencement of the upward movement of the vertical slide, the V-trough 42 is returned from its position in line with the die opening to a position to receive another cup. The pivotal mounting of the side 42a of the trough permits this return movement, by enabling the side 42a to rock outwardly against the action of the spring and slip by the push-rod 52. This allows greater time for the introduction of a new cup into the trough.

While an illustrative form of machine embodying the various features of the present invention has been described in considerable detail, it will be understood that numerous changes may be made in the construction and arrangement of the various parts without departing from the general principles and scope of the present invention. For example, the timing of the various movements of the cutter may be altered, if desired. Thus the vertical slide may first be lifted and then restored to its central position, then the rock plate may be rocked to carry the cutter sidewise in each direction, and then the slide moved downwardly to complete the trimming operation. So also, if desired, the scrap splitting cutter 77 may be omitted so that the scrap will be formed as a single piece.

What I claim is:

1. In a machine of the class described, a frame, a die carried by said frame having an opening for receiving and retaining a cylindrical portion of a work piece, a cutter extending substantially axially of said die opening and into said portion of the work piece, a member for supporting said cutter, a member shiftably mounted on said frame and carrying said supporting member, said supporting member being given substantially rectilinear bodily movement in a direction transverse to the axis of said die opening upon shifting of said carrying member, said supporting member being shiftable on said carrying member to move said cutter substantially rectilinearly in a direction transverse to the axis of the die opening and at about right angles to said bodily movement, means for imparting said shifting movements to said members to carry the cutter successively in four directions from the axis of the die opening, said means including a rotary shaft and cams thereon, and stationary cutting edges arranged to cooperate with said cutter upon such movements to cut away predetermined portions of said work piece.

2. In a machine of the class described, a frame, a die carried by said frame having an opening for receiving and retaining a cylindrical portion of a work piece, means for automatically introducing and retaining said portions of said work piece in said opening, a cutter extending substantially axially of said die opening and into said portion of the work piece, a member for supporting said cutter, a member shiftably mounted on said frame and carrying said supporting member, said supporting member being given substantially rectilinear bodily movement in a direction transverse to the axis of said die opening upon shifting of said carrying member, said supporting member being shiftable on said carrying member to move said cutter substantially rectilinearly in a direction transverse to the axis of the die opening and at about right angles to said bodily movement, means for imparting said shifting movements to said members to carry the cutter successively in four directions from the axis of the die opening, and stationary cutting edges arranged to cooperate with said cutter upon such movements to cut away predetermined portions of said work piece.

3. In a machine of the class described, a frame, a die carried by said frame having an opening for receiving and retaining a cylindrical portion of a work piece, spring means for yieldingly urging said die into a predetermined position on said frame, a cutter extending substantially axially of said die opening and into said portion of the work piece, a member for supporting said cutter, a member shiftably mounted on said frame and carrying said supporting member, said supporting member being given substantially rectilinear bodily movement in a direction transverse to the axis of said die opening upon shifting of said carrying member, said supporting member being shiftable on said carrying member to move said cutter substantially rectilinearly in a direction transverse to the axis of the die opening and at about right angles to said bodily movement, means for imparting said shifting movement to said members to carry the cutter successively in four directions from the axis of the die opening, and stationary cutting edges carried by said die arranged to cooperate with said cutter upon such movements to cut away predetermined portions of said work piece.

4. In a machine of the class described, a frame, a die carried by said frame having an opening for receiving and retaining a cylindrical portion of a work piece, a cutter extending substantially axially of said die opening and into said portion of the work piece, a member for supporting said cutter, a member shiftably mounted on said frame and carrying said supporting member, said supporting member being given substantially rectilinear bodily movement in a direction transverse to the axis of said die opening upon shifting of said carrying member, said supporting member being shiftable on said carrying member to move said cutter substantially rectilinearly in a direction transverse to the axis of the die opening and at about right angles to said bodily movement, means for imparting said shifting movements to said members to carry the cutter successively in four directions from the axis of the die opening, said means restoring said cutter to said axis after each movement, and stationary cutting edges cooperating with said cutter to remove selected portions of said work piece upon the movement of said cutter, said cutter and cutting edges being so formed and arranged as to remove the major circumferential portion of a predetermined length at the end of said cylindrical portion of the work piece leaving thereby only a projecting tab.

5. In a machine of the class described, a frame, a die carried by said frame having an opening for receiving and retaining a cylindrical portion of a work piece, a cutter extending substantially axially of said die opening and into said portion of the work piece, a member for supporting said cutter, a member shiftably mounted on said frame and carrying said supporting member, said supporting member being given substantially rectilinear bodily movement in a direction transverse to the axis of said die opening upon shifting of said carrying member, said supporting member being shiftable on said carrying member to move said cutter substantially rectilinearly in a direction transverse to the axis of the die opening and at about right angles to said bodily movement, separate means for imparting said shifting movements to each of said members to carry the cutter successively in four directions from the axis of the die opening, means for locking said supporting member in fixed relation to said carrying member as the latter is shifted, and stationary cutting edges arranged to cooperate with said cutter upon such movements to cut away predetermined portions of said work piece.

6. In a machine of the class described, a frame, a die carried by said frame having an opening for receiving and retaining a cylindrical portion of a work piece, means for automatically introducing and retaining said portion of said work piece in said opening, a cutter extending substantially axially of said die opening and into said portion of the work piece, a member for supporting said cutter, a member shiftably mounted on said frame and carrying said supporting member, said supporting member being given substantially rectilinear bodily movement in a direction transverse to the axis of said die opening upon shifting of said carrying member, said supporting member being shiftable on said carrying member to move said cutter substantially rectilinearly in a direction transverse to the axis of the die opening and at about right angles to said bodily movement, means for imparting said shifting movements to said members to carry the cutter successively in four directions from the axis of the die opening, stationary cutting edges arranged to cooperate with said cutter upon such movements to cut away predetermined portions of said work piece, and means for automatically removing the work pieces from said die opening upon completion of the cutting operations.

7. In a machine of the class described, a frame, a die carried by said frame having an opening for receiving and retaining a cylindrical portion of a work piece, means for automatically introducing and retaining said portion of said work piece in said opening, a cutter extending substantially axially of said die opening and into said portion of the work piece, a member for supporting said cutter, a member shiftably mounted on said frame and carrying said supporting member, said supporting member being given substantially rectilinear bodily movement in a direction transverse to the axis of said die opening upon shifting of said carrying member, said supporting member being shiftable on said carrying member to move said cutter substantially rectilinearly in a direction transverse to the axis of the die opening and at about right angles to said bodily movement, means for imparting said shifting movements to said members to carry the cutter successively in four directions from the axis of the die opening, stationary cutting edges arranged to cooperate with said cutter upon such movements to cut away predetermined portions of said work piece, and means for automatically removing the cut away portions of the work pieces from the region of the cutter and also removing the remaining main part of the work pieces from said die opening upon completion of the cutting operations.

8. In a machine of the class described, a frame, a die carried by said frame having an opening for receiving and retaining a cylindrical portion of a work piece, a cutter extending axially into said die opening, a member for supporting said cutter, a member shiftably mounted on said frame and carrying said supporting member, said supporting member being given substantially rectilinear bodily movement in a direction transverse to the axis of said die opening upon shifting of said carrying member, said supporting member being shiftable on said carrying member to move said cutter substantially rectilinearly in a direction transverse to the axis of the die opening and at about right angles to said bodily movement, means for imparting said shifting movements to said members to carry the cutter successively in four directions from the axis of the die opening, stationary cutting edges cooperating with said cutter to remove selected portions of said work piece upon the movement of said cutter, said cutter having a longitudinally extending groove in its outer surface presenting longitudinal cutting edges adapted to form a tab upon movement of the cutter in one direction, and means for automatically disengaging said tab from said groove upon the movement of the cutter in the opposite direction.

9. In a machine of the class described, a frame, a die carried by said frame having an opening for receiving and retaining a cylindrical portion of a work piece, a cutter extending substantially axially of said die opening and into said portion of the work piece, a member for supporting said cutter, a member shiftably mounted on said frame and carrying said supporting member, said supporting member being given substantially rectilinear bodily movement in a direction transverse to the axis of said die opening upon shifting of said carrying member, said supporting member being shiftable on said carrying member to move said cutter substantially rectilinearly in a direction transverse to the axis of the die opening and at about right angles to said bodily movement, means for imparting said shifting movements to said members to carry the cutter successively in four directions from the axis of the die opening, stationary cutting edges cooperating with said cutter to remove selected portions of said work piece upon the movement of said cutter, said cutter having a longitudinally extending groove in its outer surface presenting longitudinal cutting edges adapted to form a tab upon movement of the cutter in one direction, and means including a wedge member slidable longitudinally of said groove for automatically disengaging said tab from said groove upon the movement of the cutter in the opposite direction, said wedge member serving to substantially fill the active portion of said groove during movement of said cutter in the other of said four directions.

10. In a machine of the class described, a frame, a die carried by said frame having an opening for receiving and retaining a cylindrical portion of a work piece, a cutter extending substantially axially of said die opening and into said portion of the work piece, a member for supporting said cutter, a member shiftably mounted on said frame and carrying said supporting member, said supporting member being given substantially rectilinear bodily movement in a direction transverse to the axis of said die opening upon shifting of said carrying member, said supporting member being shiftable on said carrying member to move said cutter substantially rectilinearly in a direction transverse to the axis of the die opening and at about right angles to said bodily movement, means for imparting said shifting movements to said members to carry the cutter successively in four directions from the axis of the die opening, stationary cutting edges cooperating with said cutter to remove selected portions of said work piece upon the movement of said cutter, said cutter having a longitudinally extending groove in its outer surface presenting longitudinal cutting edges adapted to form a tab upon movement of the cutter in one direction, a plurality of longitudinally movable slides mounted on said supporting member adjacent said cutter and parallel therewith, one of said slides carrying a wedge member arranged upon movement to disengage the tab from said groove, the other of said slides being arranged upon movement to eject the work piece from said die opening, and means for operating said slides in timed relation to the movements of said cutter.

11. In a machine of the class described, a frame, a slide shiftable substantially along a straight line on said frame, a rock member pivotally mounted on said slide, a cutter carried by said rock member at a point which shifts in a direction substantially at right angles to the direction of movement of said slide, a main operating member, connections therefrom for shifting said slide and rocking said rock member in timed relation to carry said cutter successively in four directions from a central position thereof, means carried by said frame having cutting edges thereon cooperating with cutting edges on said cutter to effect a shearing action upon movement of the cutter, and means including a member operated by said main operating member for positioning a tubular work piece with a desired portion of its periphery between the cutting edges of said cutter and those on said means carried by said frame.

12. In a machine of the class described, a frame, a slide shiftable substantially along a straight line on said frame, a rock member pivotally mounted on said slide, a cutter carried by said rock member at a point which shifts in a direction substantially at right angles to the direction of movement of said slide, a main operating member, connections therefrom for shifting said slide and rocking said rock member in timed relation to carry said cutter successively in four directions from a central position thereof, means controlled by said main operating member for locking said rock member in fixed relation to said slide when the latter is being shifted, means carried by said frame having cutting edges thereon cooperating with cutting edges on said cutter to effect a shearing action upon movement of the cutter, and means including a member operated by said main operating member for positioning a tubular work piece with a desired portion of its periphery between the cutting edges of said cutter and those on said means carried by said frame.

13. In a machine of the class described, a frame, a slide shiftable substantially along a straight line on said frame, a rock member pivotally mounted on said slide, a cutter carried by said rock member at a point which shifts in a direction substantially at right angles to the direction of movement of said slide, a main operating member, connections therefrom for shifting said slide and rocking said rock member in timed relation to carry said cutter successively in four directions from a central position thereof, means carried by said frame having cutting edges thereon cooperating with cutting edges on said cutter to effect a shearing action upon movement of the cutter, a chute for the delivery of tubular work pieces to be sheared, and means controlled by said operating member for transferring said work pieces successively from said chute to a position in which a desired portion of each work piece is presented for shearing action by said cutting edges upon movement of the cutter.

14. In a machine of the class described, a frame, a slide shiftable substantially along a straight line on said frame, a rock member pivotally mounted on said slide, a cutter carried by said rock member at a point which shifts in a direction substantially at right angles to the direction of movement of said slide, a main operating member, connections therefrom for shifting said slide and rocking said rock member in timed relation to carry said cutter successively in four directions from a central position thereof, means carried by said frame having cutting edges thereon cooperating with cutting edges on said cutter to effect a shearing action upon movement of the cutter, a chute for the delivery of tubular work pieces to be sheared, means controlled by said operating member for transferring said work pieces successively from said chute to a position in which a desired portion of each work piece is presented for shearing action by said cutting edges upon movement of the cutter, and means controlled by said operating member for ejecting said work pieces upon completion of said shearing action.

15. In a machine of the class described, a frame, a slide shiftable substantially along a straight line on said frame, a rock member pivotally mounted on said slide, a cutter carried by said rock member at a point which shifts in a direction substantially at right angles to the direction of movement of said slide, a main operating member, connections therefrom for shifting said slide and rocking said rock member in timed relation to carry said cutter successively in four directions from a central position thereof, means carried by said frame having cutting edges thereon cooperating with cutting edges on said cutter to effect a shearing action upon movement of the cutter, a chute for the delivery of tubular work pieces to be sheared, means controlled by said operating member for transferring said work pieces successively from said chute to a position in which a desired portion of each work piece is presented for shearing action by said cutting edges upon movement of the cutter, and means controlled by said operating member for ejecting said work pieces upon completion of said shearing action and simultaneously directing a blast of air to forcibly discharge scrap which has been sheared from said work pieces.

16. In a machine of the class described, a frame, a slide shiftable substantially along a straight line on said frame, a rock member pivotally mounted on said slide, a cutter carried by said rock member at a point which shifts in a direction substantially at right angles to the direction of movement of said slide, a main operating member, connections therefrom for shifting said slide and rocking said rock member in timed relation to carry said cutter successively in four directions from a central position thereof, means carried by said frame having cutting edges thereon cooperating with cutting edges on said cutter to effect a shearing action upon movement of the cutter, spring means for yieldingly urging said last mentioned means against said rock member, and means including a member operated by said main operating member for positioning a tubular work piece with a desired portion of its periphery between the cutting edges of said cutter and those on said means carried by said frame.

17. In a machine of the class described a cutter having a longitudinally extending groove, a cooperating member having cutting edges arranged to produce a shearing action on an interposed work piece in conjunction with the edges of said groove upon relative movement between said cutter and member, said member having a portion arranged to enter said groove upon such relative movement, means for producing said relative movement and a series of additional relative movements between said cutter and said member, and a slide within said groove arranged to disengage therefrom any portion of said work piece which may tend to remain therein upon completion of said first mentioned relative movement, said slide serving also to substantially fill said groove during said additional relative movements.

18. In a machine of the class described, a holder adapted to retain a tubular article, a cutter extending axially into the article retained by said holder, said holder having cutting edges cooperating with cutting edges at the end of said cutter to shear said article circumferentially upon a plurality of relative movements of the holder and cutter in a plurality of substantially rectilinear directions transverse to the axes thereof, cutting edges on said holder and cutter adapted to shear said article longitudinally upon such relative movements, and means for producing such relative movements and thereby removing a portion at the end of the tubular article and leaving a projecting tab thereon.

19. In a machine of the class described, a holder adapted to retain a tubular article, a cutter extending axially into the article retained by said holder, said holder having cutting edges cooperating with cutting edges at the end of said cutter to shear said article circumferentially upon relative movement of the holder and cutter in a plurality of directions transverse to the axes thereof, cutting edges on said holder and cutter adapted to shear said article longitudinally upon such relative movement and means for producing such relative movement and thereby removing a portion at the end of the tubular article, the surface of said holder opposite the end of said cutter being relieved outwardly from the cutting edge thereof to facilitate the removal of the scrap.

JOHN H. FRIDÉN.

REFERENCES CITED

The following references are of record in the file of this patent:

UNITED STATES PATENTS

| Number | Name | Date |
| --- | --- | --- |
| 1,054,143 | Plost | Feb. 25, 1913 |
| 2,045,121 | Carvalho | June 23, 1936 |
| 2,125,269 | Buff | Aug. 2, 1938 |